(12) United States Patent
Mimura et al.

(10) Patent No.: US 7,975,038 B2
(45) Date of Patent: Jul. 5, 2011

(54) APPLICATION MANAGEMENT PROGRAM, APPLICATION MANAGEMENT METHOD, AND APPLICATION MANAGEMENT APPARATUS

(75) Inventors: Toshihiro Mimura, Kawasaki (JP); Hideki Nozaki, Kawasaki (JP); Shuichi Chiba, Kawasaki (JP); Hideo Hayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 799 days.

(21) Appl. No.: 11/788,257

(22) Filed: Apr. 19, 2007

(65) Prior Publication Data

US 2007/0198692 A1 Aug. 23, 2007

Related U.S. Application Data

(63) Continuation of application No. PCT/JP2004/015526, filed on Oct. 20, 2004.

(51) Int. Cl.
*G06F 15/173* (2006.01)
*G06F 15/16* (2006.01)

(52) U.S. Cl. ......................................... 709/223; 709/217

(58) Field of Classification Search .................. 709/220, 709/223, 224, 217, 218, 219
See application file for complete search history.

(56) References Cited

U.S. PATENT DOCUMENTS

| 6,128,657 | A | 10/2000 | Okanoya et al. | |
| 6,707,800 | B1 * | 3/2004 | Peyrovian et al. | 370/310.1 |
| 6,779,016 | B1 | 8/2004 | Aziz et al. | |
| 7,406,484 | B1 * | 7/2008 | Srinivasan et al. | 707/200 |
| 2005/0021759 | A1 * | 1/2005 | Gupta et al. | 709/226 |
| 2005/0193115 | A1 * | 9/2005 | Chellis et al. | 709/226 |
| 2008/0216098 | A1 * | 9/2008 | Agarwal et al. | 719/328 |

FOREIGN PATENT DOCUMENTS

| EP | 1 206 738 | 4/2004 |
| JP | 5-250186 | 9/1993 |
| JP | 9-218842 | 8/1997 |
| JP | 2001-022709 | 1/2001 |
| JP | 2001-331330 | 11/2001 |

(Continued)

OTHER PUBLICATIONS

Georgios Raptis; "Implementation of a Cluster of Clusters to deliver application-redundancy and load-balancing"; Brunel University, Dept. of Electronic & Computer Engineering;pp. 3-72; May 2003.

*Primary Examiner* — Patrice L Winder
*Assistant Examiner* — Ebrahim Golabbakhsh
(74) *Attorney, Agent, or Firm* — Greer, Burns & Crain, Ltd.

(57) ABSTRACT

An application management program, application management method, and application management apparatus, which are capable of controlling the start of server computers with taking relations between multilevel applications into consideration. When receiving a request for starting provision of a service, a selection unit refers to server definition information to select a start-target server computer that should start an application, in accordance with an order of starting applications predefined based on relations in processing requests. Then, a confirmation unit refers to status information to confirm whether an associated application that should be started before the application installed on the start-target server computer selected by the selection unit has been started correctly. In the case where it is confirmed that the associated application has been started correctly, a start control unit instructs the start-target server computer to start the application, and registers the success or failure of the start in the status information.

10 Claims, 16 Drawing Sheets

FOREIGN PATENT DOCUMENTS

| | | |
|---|---|---|
| JP | 2002-014938 | 1/2002 |
| JP | 2002-163241 | 6/2002 |
| JP | 2002-342107 | 11/2002 |
| JP | 2003-507817 | 2/2003 |
| JP | 2003-271395 | 9/2003 |
| WO | WO 01/14987 | 3/2001 |

* cited by examiner

113 STATUS INFORMATION GROUP

HashMap001 — 113a

| OPERATION | STATUS | MESSAGE | DETAILS |
|---|---|---|---|
| START | SUCCESS | SUCCEEDED | — |
| STOP | — | — | — |

HashMap002 — 113b

| OPERATION | STATUS | MESSAGE | DETAILS |
|---|---|---|---|
| CREATE | FAILURE | FAILED | NO AUTHORITY |
| STOP | — | — | — |

HashMap003 — 113c

| OPERATION | STATUS | MESSAGE | DETAILS |
|---|---|---|---|
| CREATE | SUCCESS | SUCCEEDED | — |
| STOP | — | — | — |

| NEW CREATION | | |
|---|---|---|
| NEW CREATION OF SERVICE | | |
| SERVICE NAME | WU001 | |
| SERVICE TYPE | ● J2EE   ○ CORBA | |
| INSTALLATION STYLE | ○ 1VM<br>● DIFFERENT VM<br>○ Web ONLY<br>○ EJB ONLY | |
| INSTALLATION PLACE | WEB SERVER CONNECTOR | ServerGrp001 ▶ |
| | Servlet CONTAINER | ServerGrp002 ▶ |
| | | No. | SERVER NAME | IP ADDRESS OF OPERATION LAN |
| | | 1 | ServerA | 10.123.112.33 ▶ |
| | | 2 | ServerB | 10.123.112.43 ▶ |
| | | 3 | ServerC | 10.123.112.53 ▶ |
| | EJB CONTAINER | ServerGrp003 ▶ |
| SERVER RELATION | ○ MESH   ● LINE | |
| CREATE | | |

APPLICATION MANAGEMENT PROGRAM, APPLICATION MANAGEMENT METHOD, AND APPLICATION MANAGEMENT APPARATUS

CROSS-REFERENCE TO RELATED APPLICATIONS

This application is a continuing application, filed under 35 U.S.C. §111(a), of International Application PCT/JP2004/015526, filed Oct. 20, 2004.

BACKGROUND OF THE INVENTION (1) Field of the Invention

This invention relates to an application management program, application management method, and application management apparatus, for managing other server computers, and more particularly to an application management program, application management method, and application management apparatus which are capable of remotely starting applications installed on server computers.

(2) Description of the Related Art

Servers provide some services by the use of a plurality of server applications operating in cooperation with each other. For example, a service can be provided by using a Web service function, an application service function, and a database service function operating in cooperation with each other.

In the following description, a function name with "server" attached last suggests a function for service provision that is realized by application software running on a computer. In addition, "server computer" suggests a computer that runs application software for service provision.

In the case where a plurality of server applications are associated with each other in a multilevel system, a client issues a processing request to a Web server. The Web server requests an application server to perform a process according to the request. The application server accesses a database server, if necessary, to acquire necessary data.

In such a multilevel system, server applications can be installed on a plurality of server computers according to their roles. For example, a Web server and an application server are installed on different server computers. If server applications run on individual server computers, load balancing on the functions of the server applications can be performed, which realizes a highly flexible system.

However, if applications that cooperate with each other run on different servers, measures for a trouble may have to be taken to a wide range. Therefore, a technique has been considered, which, if a system failure occurs, reboots each domain (server group) including a process causing the failure, so as to limit the impact area of the system failure to an area on a domain basis (for example, refer to Japanese Unexamined Patent Publication No. 2002-342107).

However, in the case where multilevel applications are installed on individual server computers, there are many precautions that should be considered for system operation, in addition to reboot in the case of failures. Therefore, an administrator has a large burden. To be specific, there are following precautions.

The first precaution is that applications have to be started with taking an operation priority (an operation order) of the applications into consideration. For example, in the case where there is a Web application that uses a database server, a server computer where the database application is installed should be booted before a server computer where the Web application is installed is booted.

The second precaution is that a group of server computers operating in parallel in load balancing mode should operate synchronously. In more detail, in a system where the same application run on parallel server computers, the parallel server computers should be booted in synchronization with each other and the application on all the server computers should be completed in synchronization with each other.

The third precaution is that if an application failure occurs, other applications may have to be interrupted in some cases. In more detail, out of a plurality of server computers running applications, operations to some server computers may fail. In this case, the performance of applications associated with the server computers in failure should be considered. For example, if the start of a database server fails, the start of a Web server having a dependency relation with the database server should be restrained.

As described above, in order to operate multilevel applications on a plurality of server computers, there are many precautions including an operation plan, resulting in an excess burden on an administrator who manages the system. To reduce the administrator's burden, these precautions should be fully considered at designing, which increases a system designer's burden. Many cautions at designing cause design mistakes.

SUMMARY OF THE INVENTION

This invention has been made in view of the foregoing and intends to provide an application management program, application management method, and application management apparatus, which are capable of controlling the start of server computers with taking relations between multilevel applications into consideration.

To solve the above problems, the present invention provides an application management program, stored in a computer-readable recording medium, for managing a system where a plurality of applications that provide services in cooperation with each other are installed on individual server computers. This application management program causing a computer to function as: a selection unit for, when receiving a request for starting provision of a service, referring to server definition information to select a start-target server computer that should start an application, in accordance with an order of starting the applications predefined based on relations in processing requests, the server definition information describing installation states of the applications providing the service on the server computers; a confirmation unit for referring to status information to confirm whether an associated application that should be started before the application installed on the start-target server computer selected by the selection unit has been started correctly, the status information containing results of a starting process to be performed by the server computers on the applications; and a start control unit for, in a case where it is confirmed that the associated application has been started correctly, instructing the start-target server computer to start the application, and registering success or failure of the start in the status information.

Further, to solve the above problems, this invention provides an application management method for managing a system where a plurality of applications that provide services in cooperation with each other are installed on individual server computers, wherein: a selection unit, when receiving a request for starting provision of a service, refers to server definition information to select a start-target server computer that should start an application, in accordance with an order of starting the applications predefined based on relations in processing requests, the server definition information describing installation states of the applications providing the service on the server computers; a confirmation unit refers to status information to confirm whether an associated application that should be started before the application installed on the start-target server computer selected by the selection unit has been started correctly, the status information containing results of a starting process to be performed by the server computers on the applications; and a start control unit, in a case where it is confirmed that the associated application has been started correctly, instructs the start-target server computer to start the application, and registers success or failure of the start in the status information.

Still further, to solve the above problems, the invention provides an application management apparatus for managing a system where a plurality of applications that provide services in cooperation with each other are installed on individual server computers, the application management apparatus comprising: a selection unit for, when receiving a request for starting provision of a service, referring to server definition information to select a start-target server computer that should start an application, in accordance with an order of starting the applications predefined based on relations in processing requests, the server definition information describing installation states of the applications providing the service on the server computers; a confirmation unit for referring to status information to confirm whether an associated application that should be started before the application installed on the start-target server computer selected by the selection unit has been started correctly, the status information containing results of a starting process to be performed by the server computers on the applications; and a start control unit for, in a case where it is confirmed that the associated application has been started correctly, instructing the start-target server computer to start the application, and registering success or failure of the start in the status information.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 10 is a view showing an example data structure of status information group.

FIG. 13 is a view showing a server definition information setting screen.

DESCRIPTION OF THE PREFERRED EMBODIMENTS

Hereinafter, a preferred embodiment will be described with reference to the accompanying drawings.

First, this invention that is implemented in the embodiment will be outlined, and then the embodiment will be specifically described.

Figure 1:
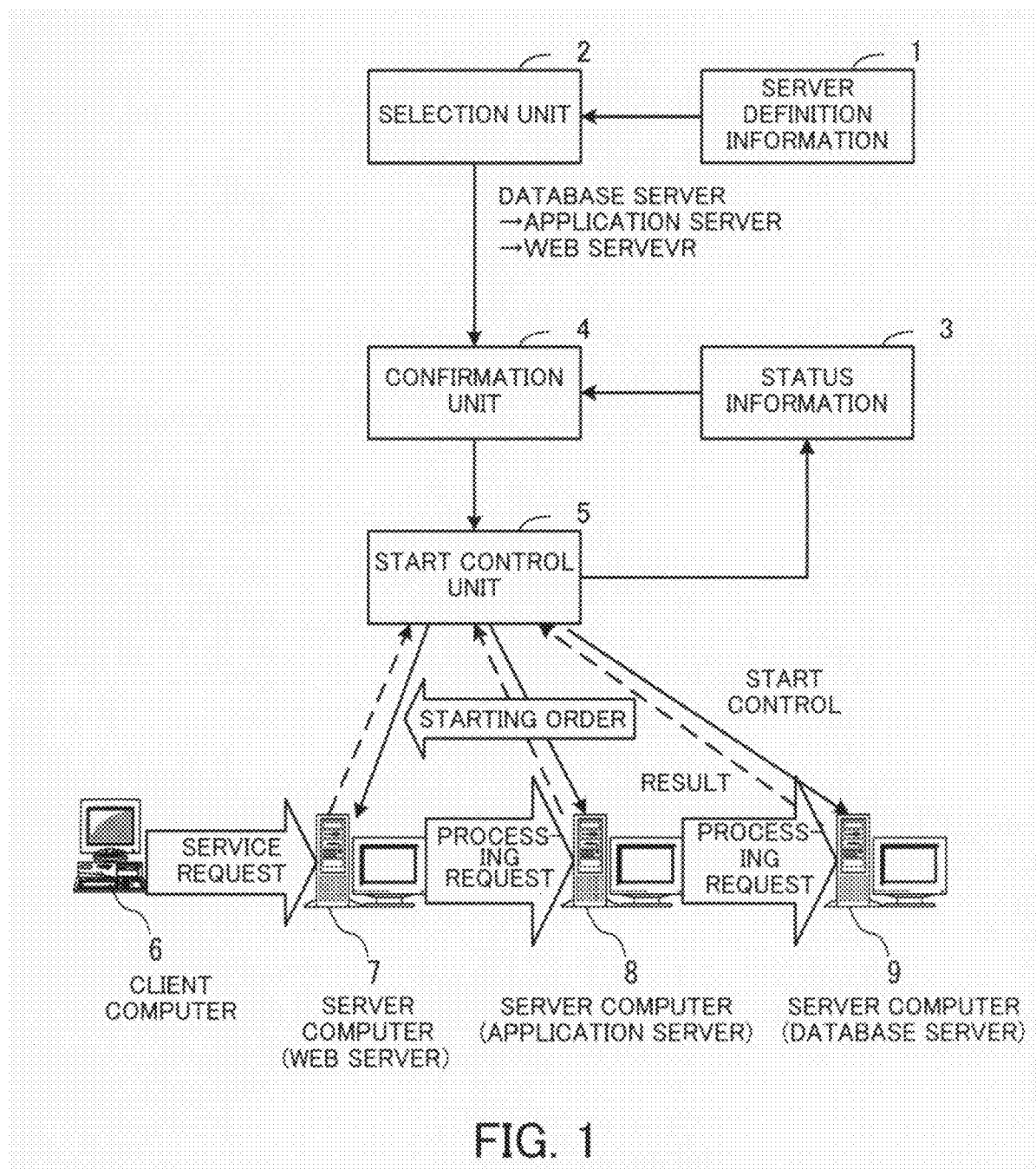
FIG. 1 is a conceptual view of the present invention that is implemented in one embodiment.

FIG. 1 is a conceptual view of this invention that is implemented in one embodiment. This invention provides server definition information 1, a selection unit 2, status information 3, a confirmation unit 4, and a start control unit 5. These elements have following functions, for managing a system where a plurality of applications that provide services in cooperation with each other are installed on individual server computers 7 to 9.

The server definition information 1 describes the installation states of the applications that provide a service on the server computers 7 to 9. For example, in the example of FIG. 1, a Web server is installed on the server computer 7, an application server is installed on the server computer 8, and a database server is installed on the server computer 9.

The selection unit 2, when receiving a request for starting provision of a service, refers to the server definition information 1 to select a start-target server computer that should start an application, in accordance with an order of starting the applications predefined based on relations in processing requests. The starting order is defined such that, in the relations in processing requests, a requesting server application is started after a requested server application is started.

In the example of FIG. 1, the Web server receives a service request from a client computer 6, and the Web server issues a processing request to the application server. If access to a database is necessary, the application server issues a processing request for database access, to the database server. In this case, an order of starting applications is the database server, the application server, and the Web server.

The status information 3 contains results of starting the applications on the server computers. For example, information indicating whether a starting process has succeeded or failed is registered as the status information 3.

The confirmation unit 4 refers to the status information 3 to confirm whether an associated application that should be started before the application installed on the start-target server computer selected by the selection unit 2 has been started correctly. For example, in the case where the server computer 8 where the application server is installed is a start-target server computer, it is confirmed whether the database server has been started correctly on the server computer 9.

In the case where it is confirmed that the associated application has been started correctly, the start control unit 5 instructs the start-target server computer to start the application. In this way, the start control is performed on the server computers 7 to 9. Then the start control unit 5 receives result notifications from the server computers under the start control, and registers information indicating whether the start has succeeded or failed, in the status information 3.

According to such configuration, when receiving a request for starting provision of a service, the selection unit 2 refers to the server definition information 1, and selects a start-target sever computer that should start an application, in accordance with an order of starting the applications predefined based on relations in processing requests. In the example of FIG. 1, the server computer 9 for the database server, the sever computer 8 for the application server, and the server computer 7 for the Web sever are selected in this order.

Then, the confirmation unit 4 refers to the status information 3 and confirms whether an associated application that should be started before the application installed on the start-target server computer selected by the selection unit 2 has been started correctly. For example, in the case where the start-target server computer is the server computer 8, it is confirmed whether the database server has been started on the server computer 8 correctly.

Then, in the case where the associated application has been started correctly, the start control unit 5 instructs the start-target server computer to start the application, and registers information indicating whether the start has succeeded or failed, in the status information 3. If the associated application has not been started correctly, the start control for the application is not performed.

As described above, in this invention, priority control of start timing of multilevel applications is performed, which makes it possible to operate a highly reliable system.

If this invention is not applied, a Web server and an application server may be started even if the start of a database server fails. In this case, the Web server accepts a service request from a client computer 6. Even if access to a database is necessary for processing the service request, access to the database cannot be made. That is, the service cannot be provided to the client computer 6.

On the other hand, in a system to which this invention is applied, an application to be requested is started in advance. Therefore, there does not cause a problem that a requesting application starts to provide a service before an application to be requested is ready for dealing with a processing request. By the time when a service starts to be provided to the client computer 6, conditions for providing the service reliably have been settled in the system. As a result, highly reliable services can be provided.

Further, the applications are stopped in a reverse order to the start timing. For example, the applications are stopped in order of the Web server, the application server, and the database server.

Still further, in the case where applications at each level operate on parallel servers (a group of server computers), synchronous start/stop can be performed at each level. For example, at starting, the start of applications on all server computers at a level where the database server applications operate is completed, and then applications on server computers that operate application servers are started.

It should be noted that, in a system where parallel servers are applied, a Web server and an application server may be associated with each other via their servers. In this case, if the start of the application server fails, the associated Web application is not started.

In addition, if installation of applications on some server computers fails, this information can be registered in the status information 3. Thereby, at the next start of applications, the server computers failed in the installation can be excluded from start targets.

As described above, applications installed on server computers in a multilevel structure can be operated for a single operation (service). This makes an operation procedure easier for a system administrator.

Further, in the case where multiple servers are operated for a single operation (service), a system administrator does not need to know a priority order of starting and stopping applications on the servers. If relations between applications are relatively simple as shown in FIG. 1, the system administrator can know such priorities without problems. However, the more complicated the relations between applications become, the more difficult the administrator knows the priorities.

For example, in the case where there are a plurality of server groups where Web servers are installed and there are a plurality of server groups where application servers are installed, the groups per se are associated with each other. Therefore, it is difficult for an administrator to correctly know which server computers belong to the groups. In the system to which this invention is applied, priority control can be automatically performed even when multilevel applications are executed in parallel.

In addition, an application may not be installed on a server computer due to some trouble. By registering installation failure information in the status information 3, the server computer on which the application could not be installed can be excluded from choices for a start-target server computer.

Hereinafter, a specific example will be described where this invention is applied to a system that groups and manages server applications having identical functions.

Figure 2:
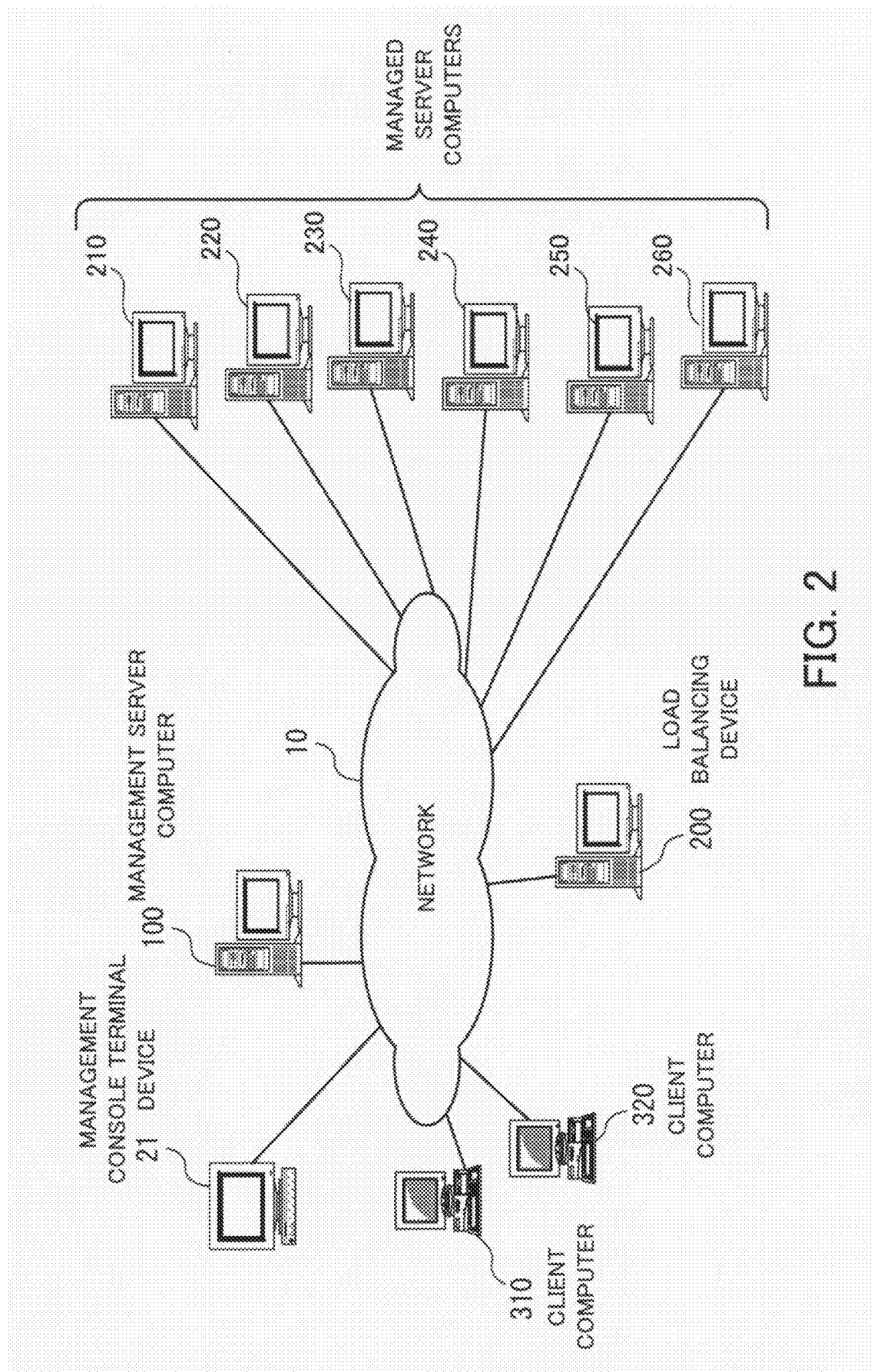
FIG. 2 is a view showing a system configuration according to the embodiment.

FIG. 2 is a view showing a system configuration according to this embodiment. In the system of this embodiment, a management server computer 100, a load balancing device 200, managed server computers 210, 220, 230, 240, 250, and 260, client computers 310 and 320, and a management console terminal device 21 are connected to each other over a network 10.

The management server computer 100 manages the managed server computers 210, 220, 230, 240, 250, and 260. For example, the management server computer 100 boots managed server computers that are used to provide a service when the service starts to be provided to the client computers 310 and 320. In the case where the service is provided by multilevel applications, the management server computer 100 boots the managed computers that have applications required for providing the service, in a prescribed order.

The load balancing device 200 distributes processing requests from the client computers 310 and 320 over the plurality of server computers.

On the managed server computers 210, 220, 230, 240, 250, and 260, various application programs are installed for dealing with requests from the client computers 310 and 320.

The client computers 310 and 320, responsive to user commands, issue processing requests to the managed server computers 210, 220, 230, 240, 250, and 260.

The management console terminal device 21 accesses the management server computer 100 in response to a command from a system administrator, and makes an instruction of starting a service or setting server definitions.

Figure 3:
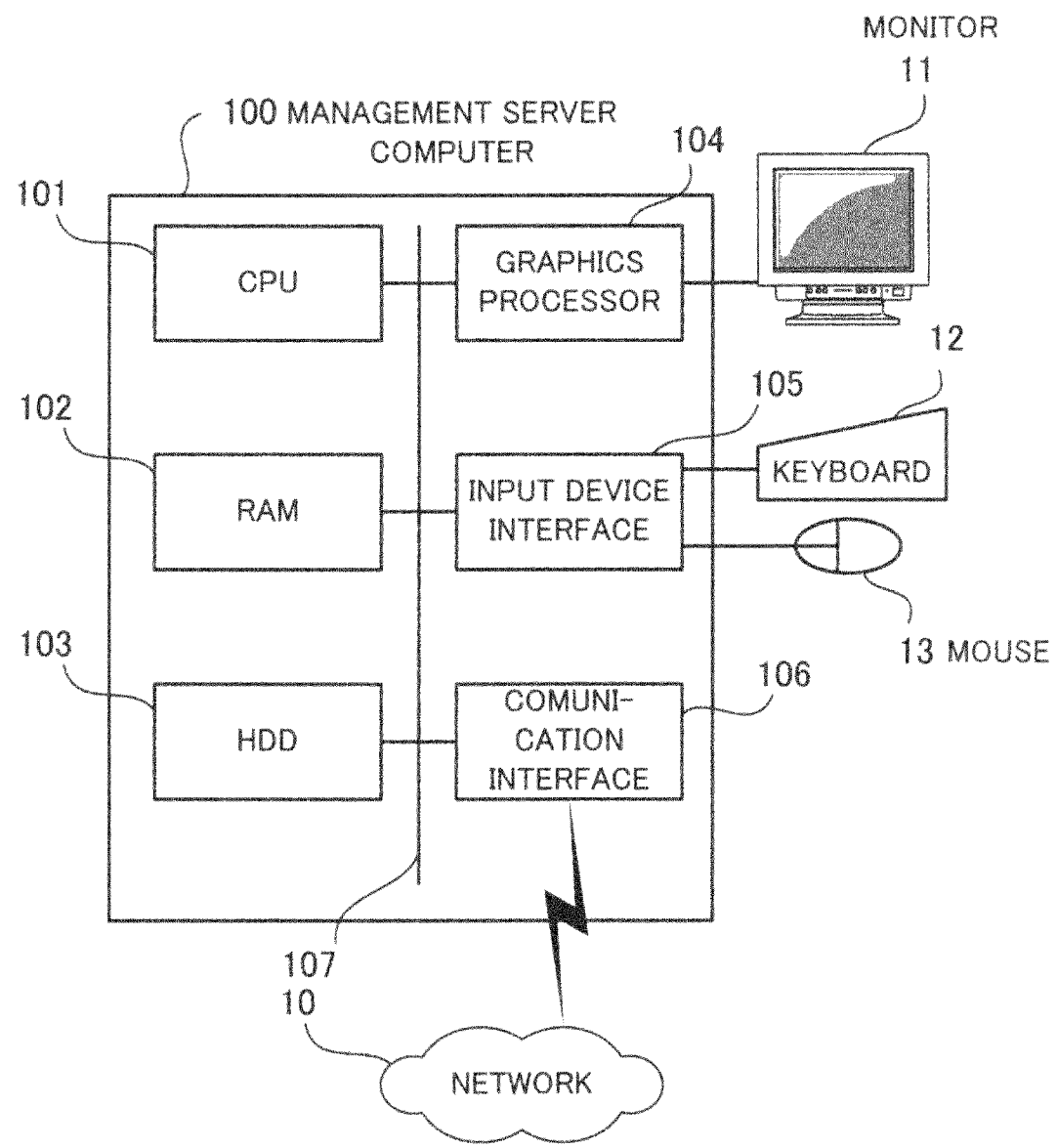
FIG. 3 is a view showing an example hardware configuration of a management server computer to be used in the embodiment.

FIG. 3 shows an example hardware configuration of a management server computer to be used in this embodiment. The management server computer 100 is entirely controlled by a Central Processing Unit (CPU) 101. Connected to the CPU 101 via the bus 107 are a Random Access Memory (RAM) 102, a Hard Disk Drive (HDD) 103, a graphics processor 104, an input device interface 105, and a communication interface 106.

The RAM 102 temporarily stores at least part of Operating System (OS) and application programs to be executed by the CPU 101. In addition, the RAM 102 stores various kinds of data for CPU processing. The HDD 103 stores the OS and application programs.

The graphics processor 104 is connected to a monitor 11. The graphics processor 104 displays images on the screen of the monitor 11 under the control of the CPU 101. The input device interface 105 is connected to a keyboard 12 and a mouse 13. The input device interface 105 transfers signals from the keyboard 12 and the mouse 13 to the CPU 101 via the bus 107.

The communication interface 106 is connected to the network 10. The communication interface 106 communicates data with other computers over the network 10.

With the above hardware configuration, the processing functions of the embodiment can be realized. FIG. 3 shows the hardware configuration of the management server computer 100, and it should be noted that the load balancing device 200, the managed server computers 210, 220, 230, 240, 250, and 260, the client computers 310 and 320, and the management console terminal device 21 can be realized with identical hardware configuration.

In such a system, the management server computer 100 classifies by processing functions and manages the managed server computers 210, 220, 230, 240, 250, and 260 into a plurality of server groups. A server group indicates a group of managed server computers that have identical service setting, perform identical operations, and should be managed altogether, out of managed server computers that are managed by the management server computer 100.

Figure 4:
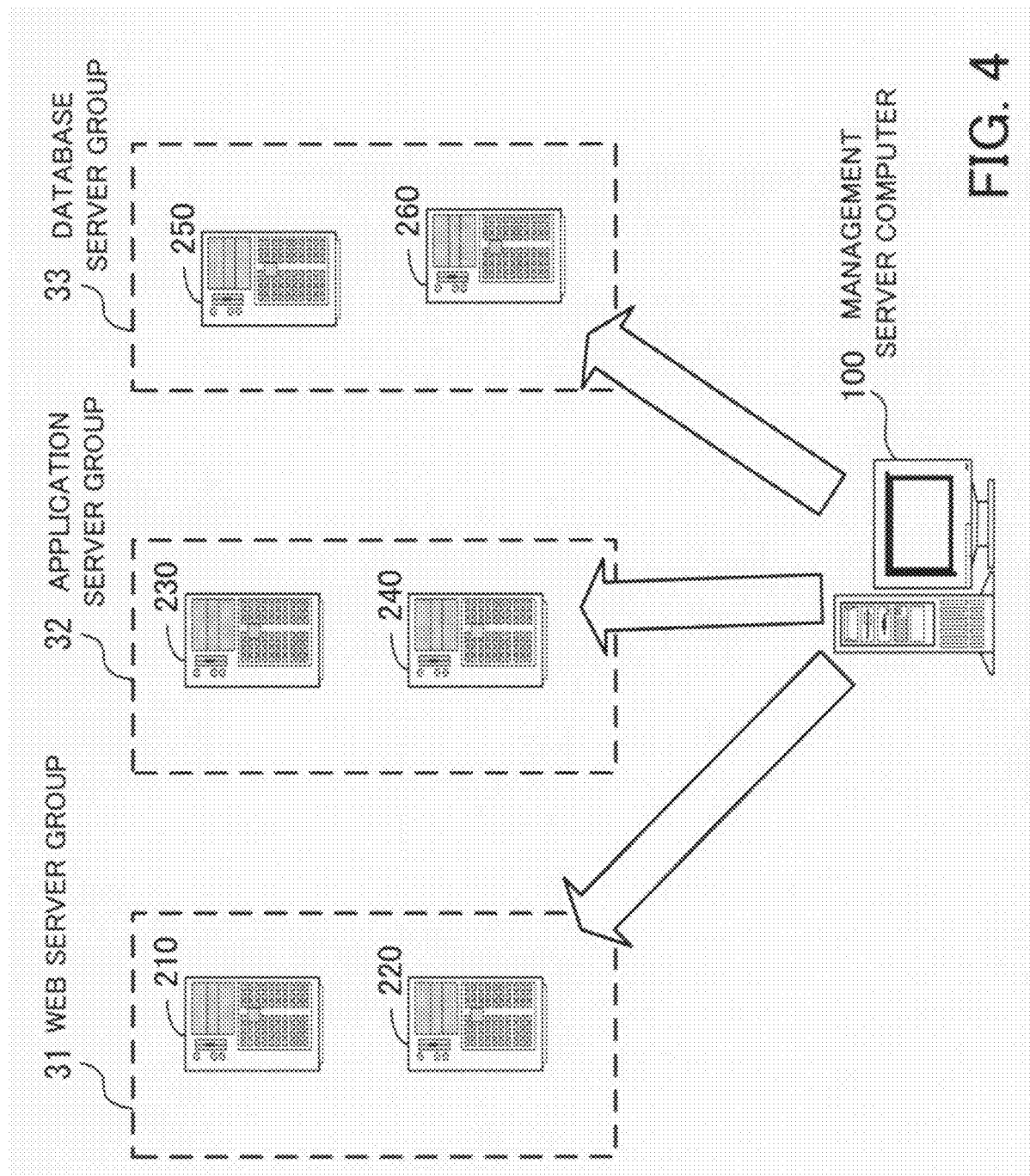
FIG. 4 is a view showing example server groups.

FIG. 4 is a view showing example server groups. In this example of FIG. 4, the managed server computers 210, 220, 230, 240, 250, and 260 are classified into three server groups.

A Web server group 31 includes the managed server computers 210 and 220 having Web server functions. An application server group 32 includes the managed server computers 230 and 240 having application server functions. A database server group 33 includes the managed server computers 250 and 260 having database server functions.

The management server computer 100 has functions of remotely operating and integrally managing each server group. Specifically, in order that multilevel managed server computers provide a service to the client computers 310 and 320, the management server computer 100 manages relations in processing requests (logical connections) between the managed server computers. The relations in processing requests are represented in a mesh load balancing connection topology (mesh topology) or in a line load balancing connection topology (line topology).

Figure 5:
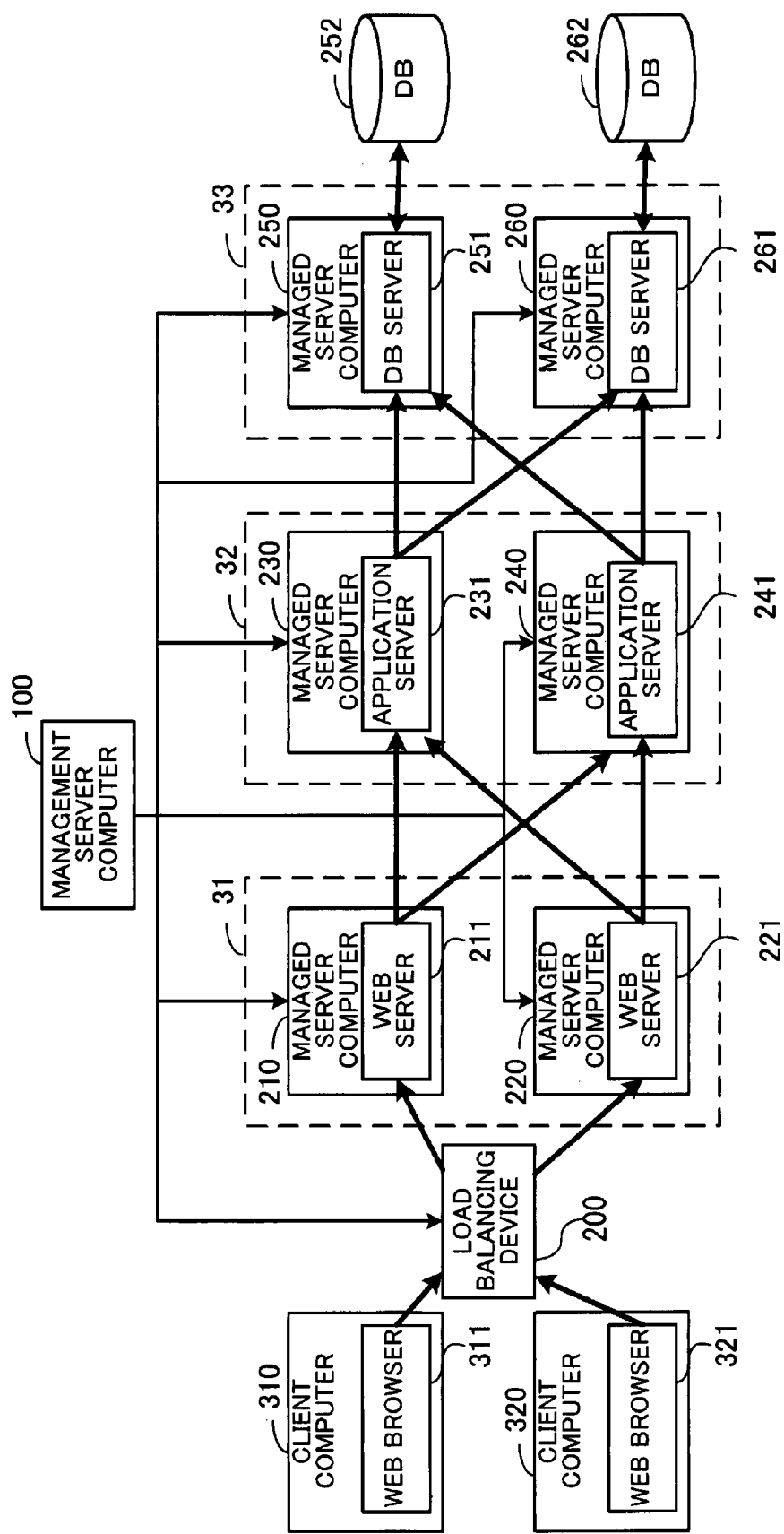
FIG. 5 is a view showing an example mesh topology.

FIG. 5 is a view showing an example mesh topology. In this example, the server applications for Web servers 211 and 221 are installed on the managed server computers 210 and 220, respectively. The server applications for application servers 231 and 241 are installed on the managed server computers 230 and 240, respectively. The server applications for database server 251 and 261 are installed on the managed server computers 250 and 260, respectively. The database servers 251 and 261 manage databases (DB) 252 and 262, respectively.

The start timing of the server applications installed on the managed server computers 210, 220, 230, 240, 250, and 260 is controlled by the management server computer 100. In addition, the detailed setting on the balancing process of the load balancing device 200 is also managed by the management server computer 100.

In the mesh topology, the Web servers 211 and 221 of the Web server group 31 and the application servers 231 and 241 of the application server group 32 are connected to each other. In addition, the application servers 231 and 241 of the application server group 32 and the database servers 251 and 261 of the database server group 33 are connected to each other.

Further, Web browsers 311 and 321 are installed on the client computers 310 and 320. Users enter various commands to the Web browsers 311 and 321 by operating the client computers 310 and 320. The Web browsers 311 and 321 output processing requests according to the commands if the entered commands include a request for providing a service over the network 10.

A processing request output from the Web browser 311, 321 is allotted to the Web server 211, 221 by the load balancing device 200. When receiving the processing request, the Web server 211, 221 requests the application server 231 or the application server 241 for the processing. The application server 231, 241 executes the requested processing and if the processing requires accessing a database, the application server 231, 241 requests the database server 251 or 261 for the processing. The database server 251, 261 accesses the database in accordance with the request.

A processing result of each server is returned to the processing requester. Thereby the requesting Web browser 311, 321 can finally receive the result of processing according to the processing supply.

In the relations in processing requests, server applications positioned closer to the client computers 310 and 320 are taken as being at a high level in the multilevel structure. In this case, in order that the server applications of the high level provide a service without problems, the server applications of low levels should run normally.

Specifically, when the Web server 211, 221 starts to provide a service, at least one of the application servers 231 and 241 has to be running normally. Similarly, when the application server 231 and 241 starts to provide the service, at least one of the database servers 251 and 261 has to be running normally.

Figure 6:
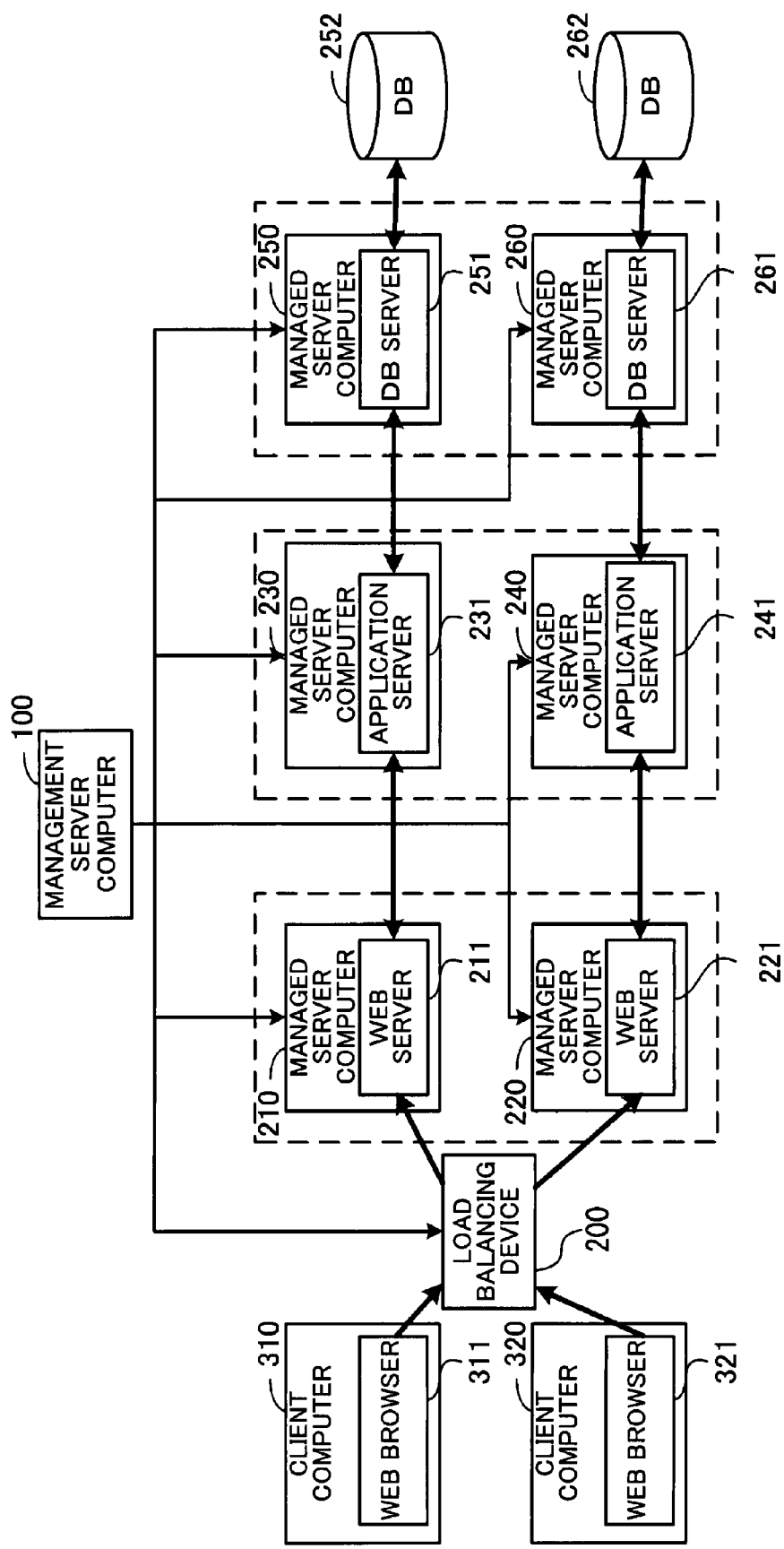
FIG. 6 is a view showing an example line topology.

FIG. 6 is a view showing an example line topology. In the line topology, servers each from each server group are associated with each other. In this example of FIG. 6, the Web server 211 and the application server 231 are associated with each other, and the application server 231 and the database server 251 are associated with each other. Similarly, the Web server 221 and the application server 241 are associated with each other, and the application server 241 and the database server 261 are associated with each other. By these servers associated with each other, multilevel services are provided.

In the line topology, managed server computers each from each server group are associated with each other. Therefore, to start a server application on each managed server computer, the starting process of the server application on an associated managed server computer of a lower level should have been completed correctly.

To be specific, when the Web server 211 starts to provide a service, the application server 231 has to be running normally. In addition, when the application server 231 starts to provide the service, the database server 251 has to be running normally.

Similarly, when the Web server 221 starts to provide a service, the application server 241 has to be running normally. In addition, when the application server 241 starts to provide the service, the database server 261 has to be running normally.

As described above, in order that server applications of a high level start to provide a service, different conditions are applied depending on the mesh topology or the line topology. Therefore, the management server computer 100 manages the connection topology for each service to be provided to the client computers 310 and 320, and controls an order of starting the server applications depending on the connection topology.

Figure 7:
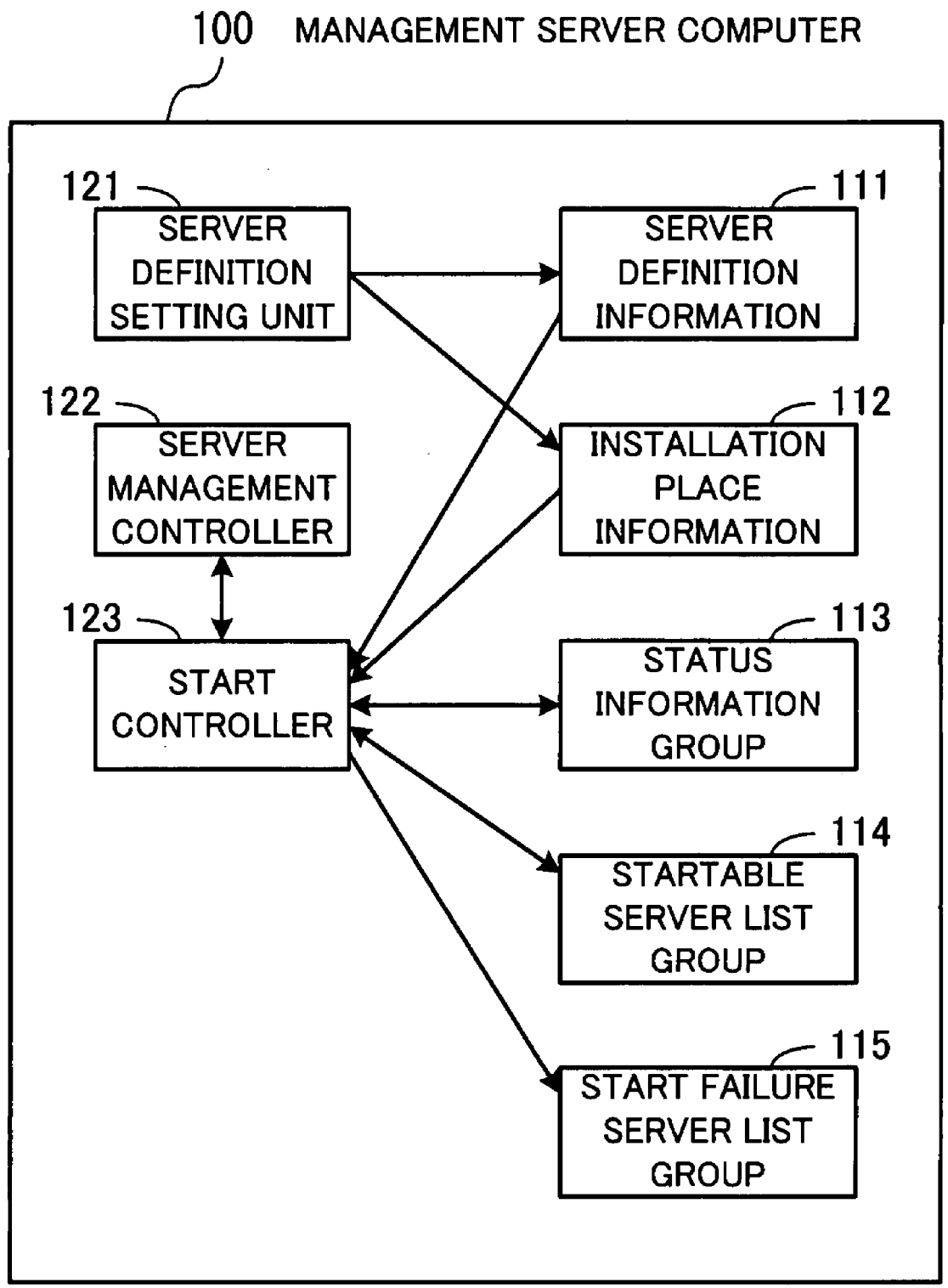
FIG. 7 is a functional block diagram of the management server computer.

FIG. 7 is a functional block diagram of the management server computer. The management server computer 100 has server definition information 111, an installation place information group 112, a status information group 113, a startable server list group 114, a start failure server list group 115, a server definition setting unit 121, a server management controller 122, and a start controller 123.

The server definition information 111 is information on managed server computers and so on which provide multilevel services to users.

The installation place information group 112 is an aggregation of information (installation place information) on managed server computers where server applications are installed.

The status information group 113 is an aggregation of information (status information) indicating processing results of operations (creation, start, stop, etc.) performed on managed server computers.

The startable server list group 114 is an aggregation of information (startable server list) showing managed server computers that have completed a starting process successfully.

The start failure server list group 115 is an aggregation of information (start failure server list) showing managed server computers which have completed a starting process unsuccessfully.

The server definition setting unit 121 registers data in the server definition information 111 according to user commands.

The server management controller 122 acquires information on a service to be provided, from the server definition information 111 in response to a user request for starting provision of the service. Then the server management controller 122 gives the start controller 123 a command to start the service to be provided.

Responsive to the start command, the start controller 123 controls an order of starting managed server computers so that server applications are executed in an order of database servers, application servers, and Web servers. Specifically, the start controller 123 determines an order of starting the server applications, and performs a starting process on the managed server computers in the starting order.

Example data structures of various information in the management server computer 100 will be described with reference to FIGS. 8 to 12.

Figure 8:
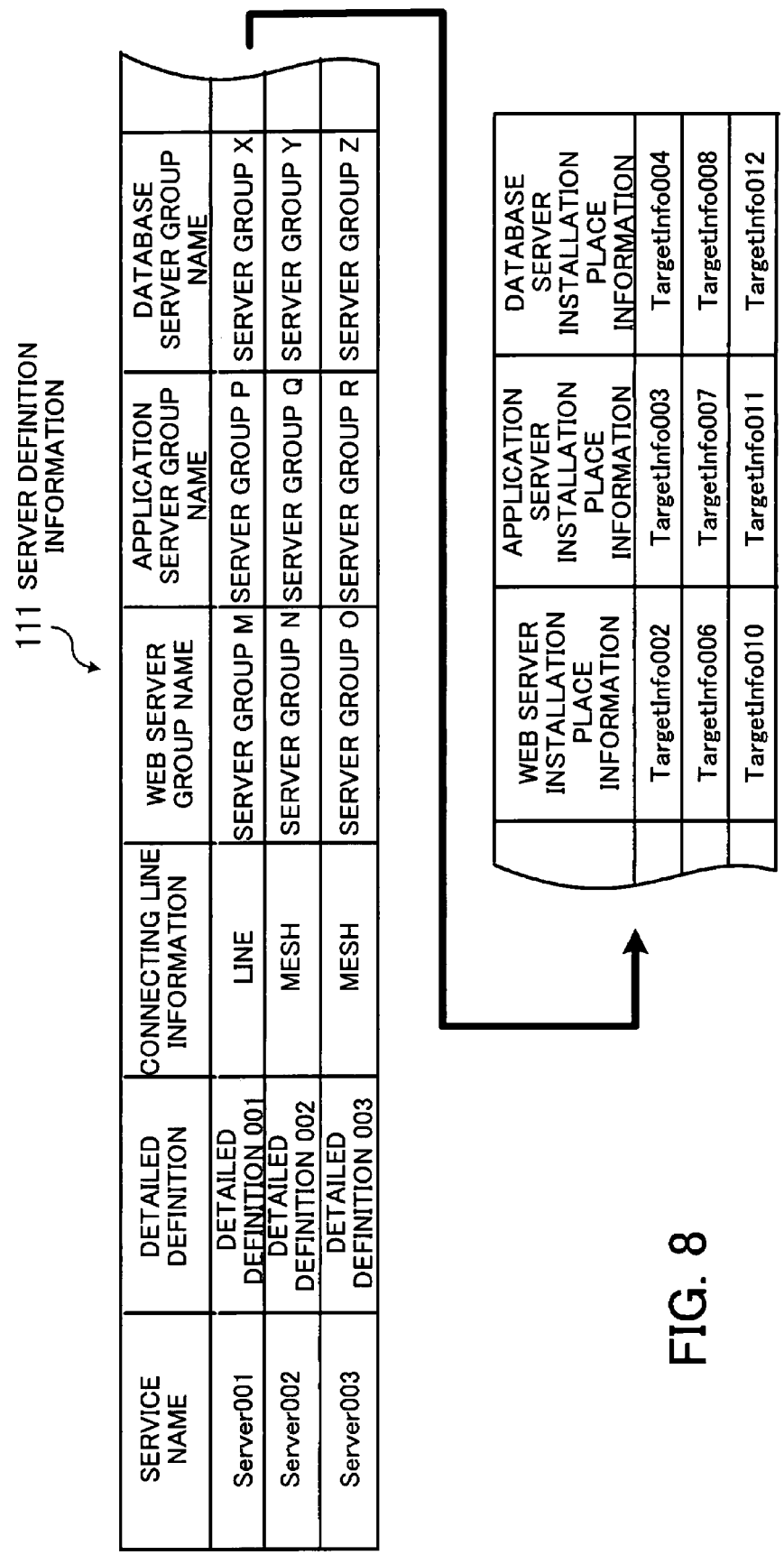
FIG. 8 is a view showing an example data structure of server definition information.

FIG. 8 is a view showing an example data structure of server definition information. The server definition information 111 has columns for service name, detailed definition, connecting line information, Web server group name, application server group name, database server group name, Web server installation place information, application server installation place information, and database server installation place information.

The service name column shows the name of a service to be provided to client computers. The detailed definition column defines detailed settings of the service.

The connecting line information column shows a logical connection topology between servers for the case where a plurality of multilevel servers provide the service. The connection topologies include a mesh topology and a line topology.

The Web server group name column shows a name that uniquely identifies a Web server group. The application server group name column shows a name that uniquely identifies an application server group. The database server group name column shows a name that uniquely identifies a database server group.

The Web server installation place information column shows a pointer leading to installation place information indicating the installation places of Web servers belonging to a corresponding Web server group. The application server installation place information column shows a pointer leading to installation place information indicating the installation places of application servers belonging to a corresponding application server group. The database server installation place information column shows a pointer leading to installation place information indicating the installation place of database servers belonging to a corresponding database server group.

Figure 9:
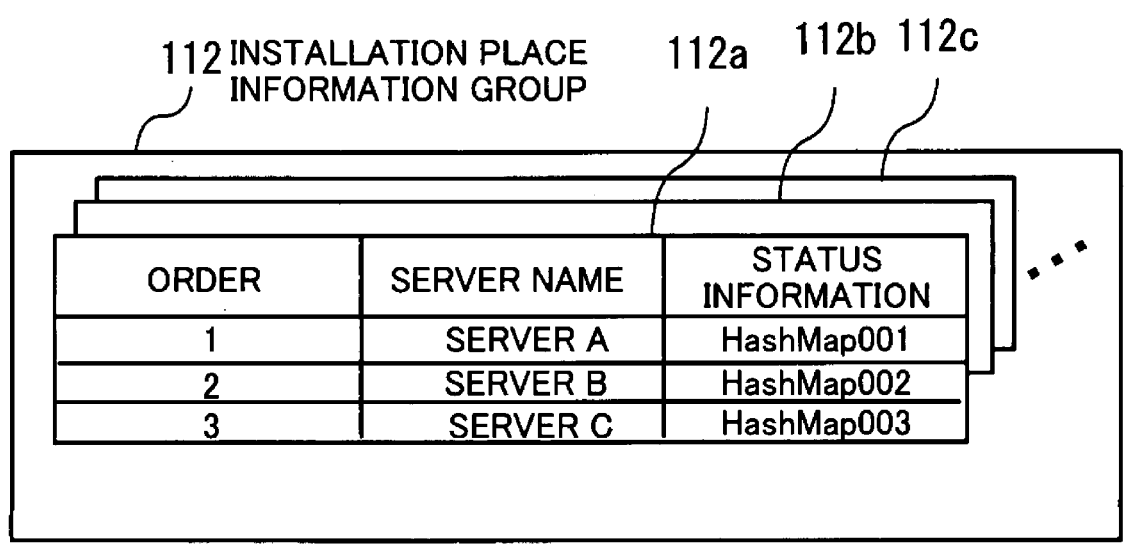
FIG. 9 is a view showing an example data structure of installation place information group.

FIG. 9 is a view showing an example data structure of an installation place information group. The installation place information group 112 comprises installation place information 112a, 112b, 112c, . . . for respective server groups. The installation place information 112a has columns for order, server name, and status information. The other installation place information 112b, 112c, . . . have an identical data structure to the installation place information 112a.

The order column shows an order of a server application set within a corresponding server group. This order is an order in which the server application participated in the server group, for example.

The server name column shows the name of a managed server computer where a server application belonging to a server group corresponding to the installation place information 112a is installed.

The status information column shows the name of status information indicating the status of a server application installed on a corresponding managed server computer.

FIG. 10 shows an example data structure of status information group. The status information group 113 comprises a plurality of status information 113a, 113b, 113c, . . . for respective server applications.

Each status information 113a, 113b, 113c, . . . has columns for operation, status, message, and details. The operation column shows the name of an operation performed by the management server computer 100 on the server application. Operations include creation, start, and stop. Creation is an operation of installing a server application on a managed server computer. Start is an operation of starting a server application. Stop is an operation of stopping a running server application.

The status column shows whether a corresponding operation has been succeeded or not. The message column shows a message to be displayed on the management console terminal device 21 as an operation result. The details column shows a special notice regarding the operation. For example, a reason why the operation has failed is set in this column.

Figure 11:
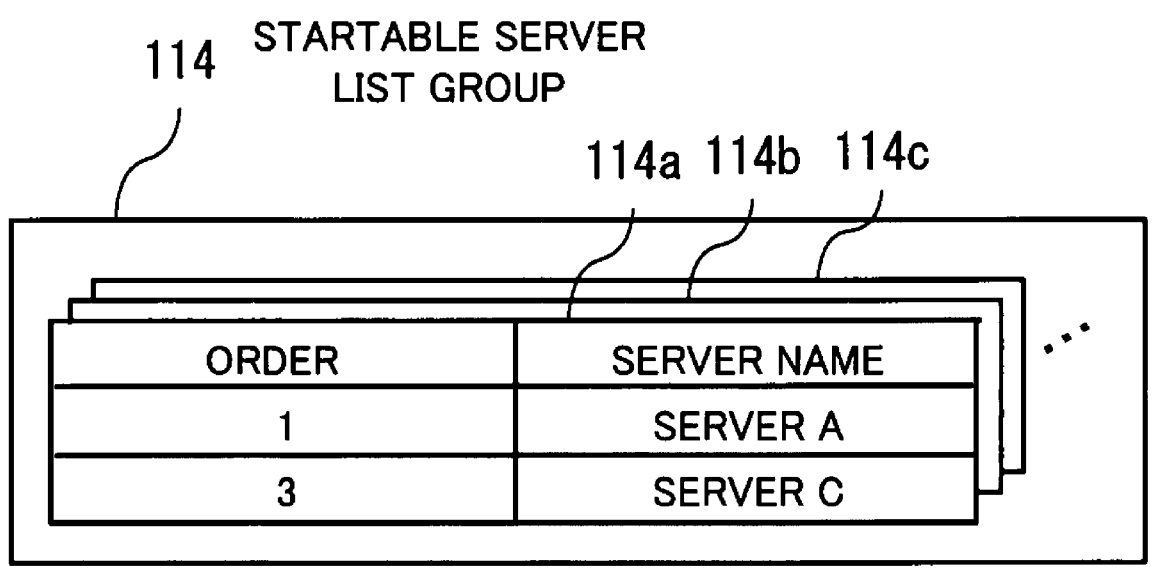
FIG. 11 is a view showing an example data structure of a startable server list group.

FIG. 11 shows an example data structure of a startable server list group. The startable server list group 114 comprises startable server lists 114a, 114b, 114c, . . . for respective server groups.

The startable server list 114a has columns for order and server name. The startable server lists 114b, 114c, . . . have an identical data structure to the startable server list 114a.

The order column shows the order of a successfully started server application, out of the server applications set in the installation place information 112a of the same server group.

The server column shows the name of a managed server computer where the successfully started server application is running.

Figure 12:
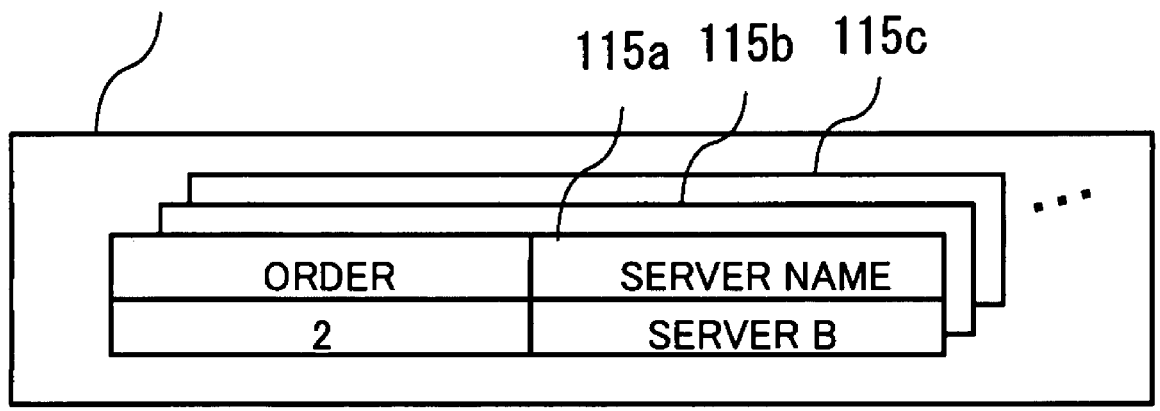
FIG. 12 is a view showing an example data structure of a start failure server list group.

FIG. 12 shows an example data structure of a start failure server list group. The start failure server list group 115 comprises start failure server lists 115a, 115b, 115c, ... for respective server groups.

The start failure server list group 115a has columns for order and server name. The start failure server list groups 115b, 115c, ... have an identical data structure to the start failure server list group 115a.

The order column shows the order of a server application which has not been started correctly, out of the server applications set in the installation place information 112a of the same server group. The server name column stores the name of a managed server computers having the failed server application.

Next explanation is about how the server definition setting unit 121 sets server definition information.

FIG. 13 is a view showing a server definition information setting screen. The server definition information setting screen 40 has a service name input section 41, a service type selection section 42, an installation style selection section 43, an installation place selection section 44, a server relation selection section 45, and a create button 46.

In the service name input section 41, a name that uniquely identifies a service to be provided to users is set.

In the service type selection section 42, the type of service is set. In this example of FIG. 13, service types include "J2EE (Java (trademark) 2 Platform, Enterprise Edition) and CORBA (Common Object Request Broker Architecture). In this example, with J2EE application selected, a multilevel system can be constructed. Consider J2EE applications, for example. A multilevel system for the J2EE applications provides levels of Web servers, Servlets, EJBs (Enterprise JavaBeans). In this case, Servlets correspond to application servers and EJB servers correspond to database servers. In addition, as to the J2EE applications, a plurality of application servers at each level can be arranged in parallel.

In the installation style selection section 43, an installation pattern can be selected for dispersedly installing server applications. In this example of FIG. 13, installation patterns include "1VM", "different VM", "WEB only", and "EJB only". VM means "Java VM (Virtual Machine)".

In the case where "1VM" is selected, a Web server, Servlet, and EJB are installed on a single managed server computer, so as to execute them with one Java VM. In the case where "Different VM" is selected, a Web server, Servlet, and EJB are installed on different managed server computers, so as to execute them with the Java VMs of corresponding managed server computers. "Web only" indicates an installation style where only Web server applications operate. "EJB only" indicates an installation style where only EJB server applications operate.

In the installation place selection section 44, an installation place of a server application is entered. The installation place selection section 44 has columns for Web server connector, Servlet container, and EJB container. In the Web server connector column, a group of managed server computers on which Web servers are installed is selected. In the Servlet container column, a group of managed server computers on which Servlets (application servers) are installed is selected. The EJB container column, a group of managed server computer on which EJB (database servers) are installed is selected.

When a server group is selected in the installation place selection section 44, information on the managed server computers belonging to the server group is displayed. For example, with respect to the managed server computers, orders (No.), server names, and the IP address of operation LAN are displayed.

In the server relation selection section 45, a connection relation of servers is specified. As a connection relation, a mesh connection or a line connection can be selected.

The create button 46 is a button for creating definition information of a service based on the contents entered on the server definition information setting screen 40. When the create button 46 is pressed, the server definition setting unit 121 adds to the server definition information 111 a new record created based on the contents entered on the server definition information setting screen 40.

Next explanation is about how the management server computer 100 starts server applications in the above-described system.

Figure 14:
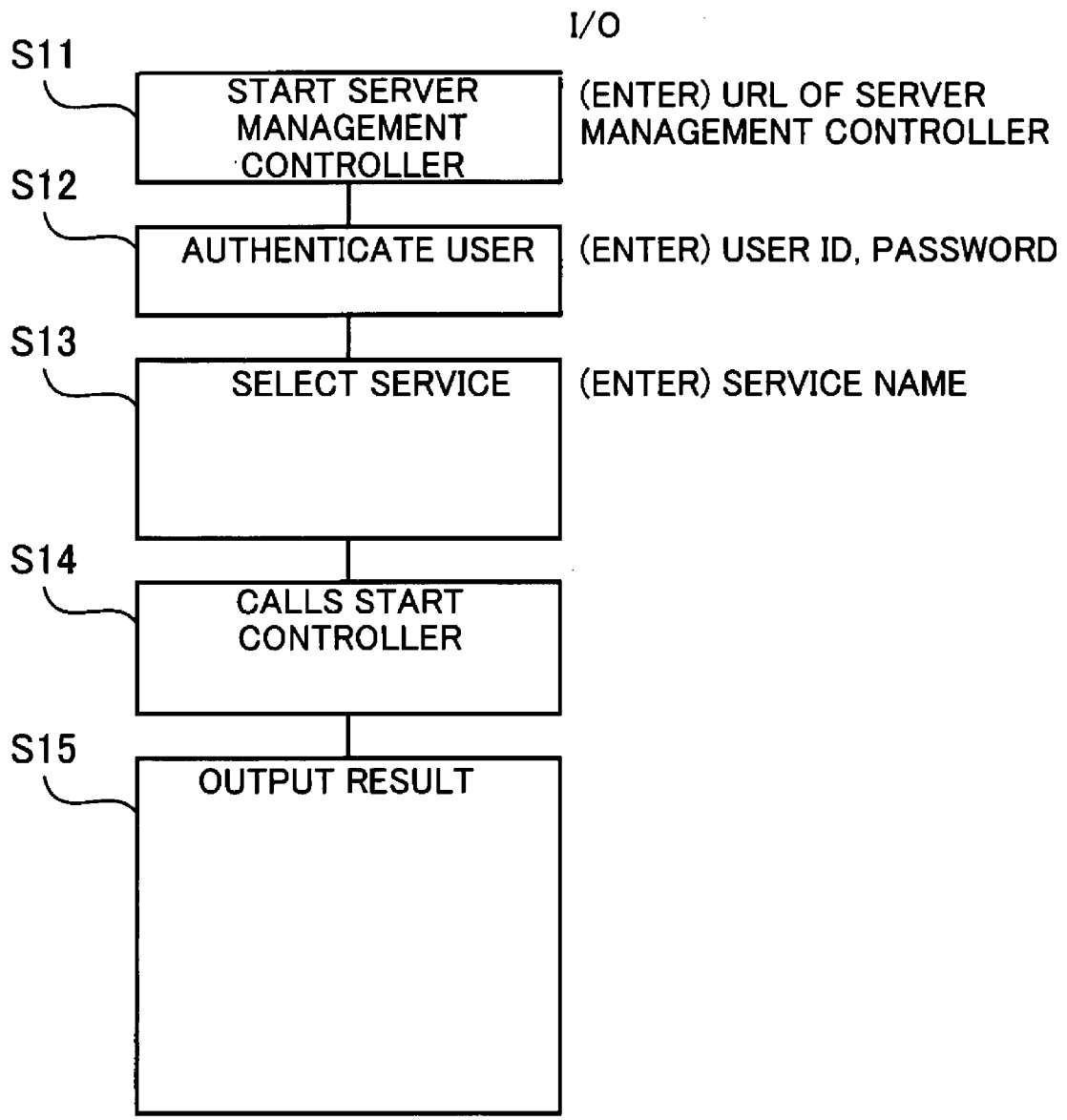
FIG. 14 is a view showing a procedure in the management server computer.

FIG. 14 shows a view showing a processing procedure of the management server computer. The processes shown in FIG. 14 will be described following step numbers.

(Step S11) When a start request specifying a URL (Uniform Resource Locator) of the server management controller 122 is issued to the management server computer 100 from the management console terminal device 21, the OS of the management server computer 100 starts the server management controller 122.

(Step S12) The server management controller 122 accepts a user ID and password from the management console terminal device 21 and performs user authentication based on the received information.

(Step S13) The server management controller 122 accepts from the management console terminal device 21 the service name of a service that starts to be provided to the client computers 310 and 320. Then the server management controller 122 selects the service corresponding to the received service name.

(Step S14) The server management controller 122 calls the start controller 123 to request it to start applications, and gives the start controller 123 the service name of the service selected at step S13. The server management controller 122 receives a result of the starting process as a return value from the start controller 123. This process will be described in detail later.

(Step S15) The server management controller 122 outputs the result to the management console terminal device 21.

Figure 15:
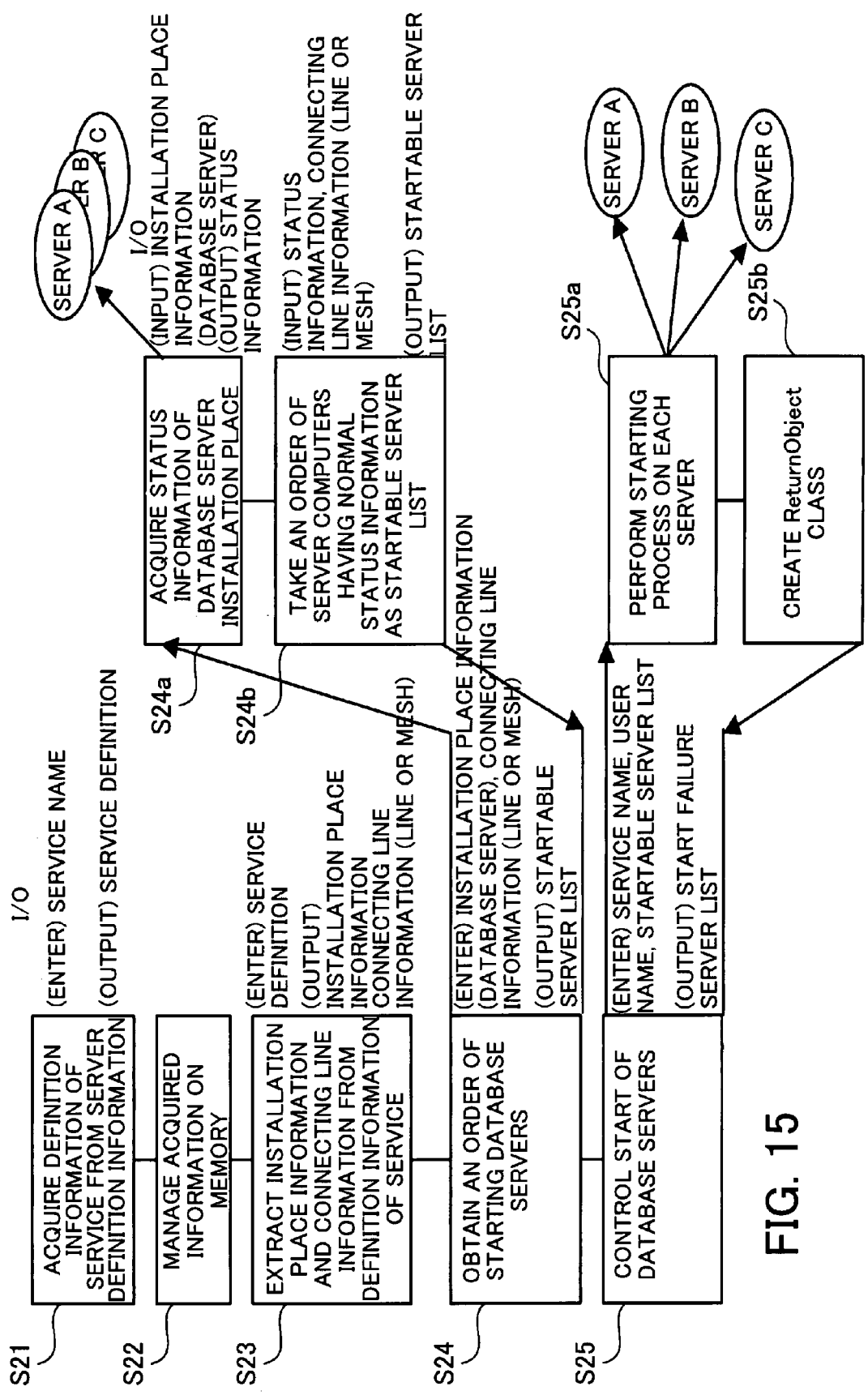
FIG. 15 is a view showing the first half of a detailed procedure of a start control process.

FIG. 15 is a view showing the first half of a detailed procedure of a start control process. The processes of FIG. 15 will be described following step numbers.

(Step S21) When receiving a start request of applications and a service name from the server management controller 122, the start controller 123 acquires definition information of the service corresponding to the service name.

(Step S22) The start controller 123 writes the acquired definition information on a memory (for example, RAM 102) and manages it on the memory.

(Step S23) The start controller 123 extracts installation place information (Web server installation place information 112a, application server installation place information 112b, and database server installation place information 112c) and connecting line information (line connection or mesh connection) from the installation place information group 112.

(Step S24) The start controller 123 obtains an order of starting database servers (startable server list) based on the database server installation place information and the connecting line information. Specifically, this step is realized by following steps (steps S24a and S24b).

(Step S24a) The start controller 123 refers to the database server installation place information in the installation place information group 112, to acquire the name of status information of managed server computers where database servers are installed.

(Step S24b) The start controller 123 acquires the status information of the managed server computers where the database servers are installed, from the status information group 113. In addition, the start controller 123 detects a line connection or a mesh connection from the connecting line information acquired from the server definition information 111.

Then, the start controller 123 acquires the orders of the managed server computers where the database servers are installed, and takes the orders of managed server computers having normal status information, out of the managed server computers, as a startable server list. The normal status information indicates that server applications have been installed successfully.

(Step S25) The start controller 123 controls the start of the database servers based on the service name, the user name, and the startable server list. Then, the start controller 123 creates a start failure server list. Specifically, this step is realized by following steps (steps S25a and S25b).

(Step S25a) The start controller 123 performs a starting process of the database servers on the managed server computers registered in the startable server list.

(Step S25b) The start controller 123 creates a ReturnObject class. This ReturnObject class is an aggregation of server statuses, or an aggregation of information indicating a start failure, and is used as a start failure server list. In addition, the start controller 123 reflects the results of the starting process on the server definition information 111.

As described above, the starting process of database servers is performed. After that, the starting process of application servers and web servers are sequentially performed.

Figure 16:
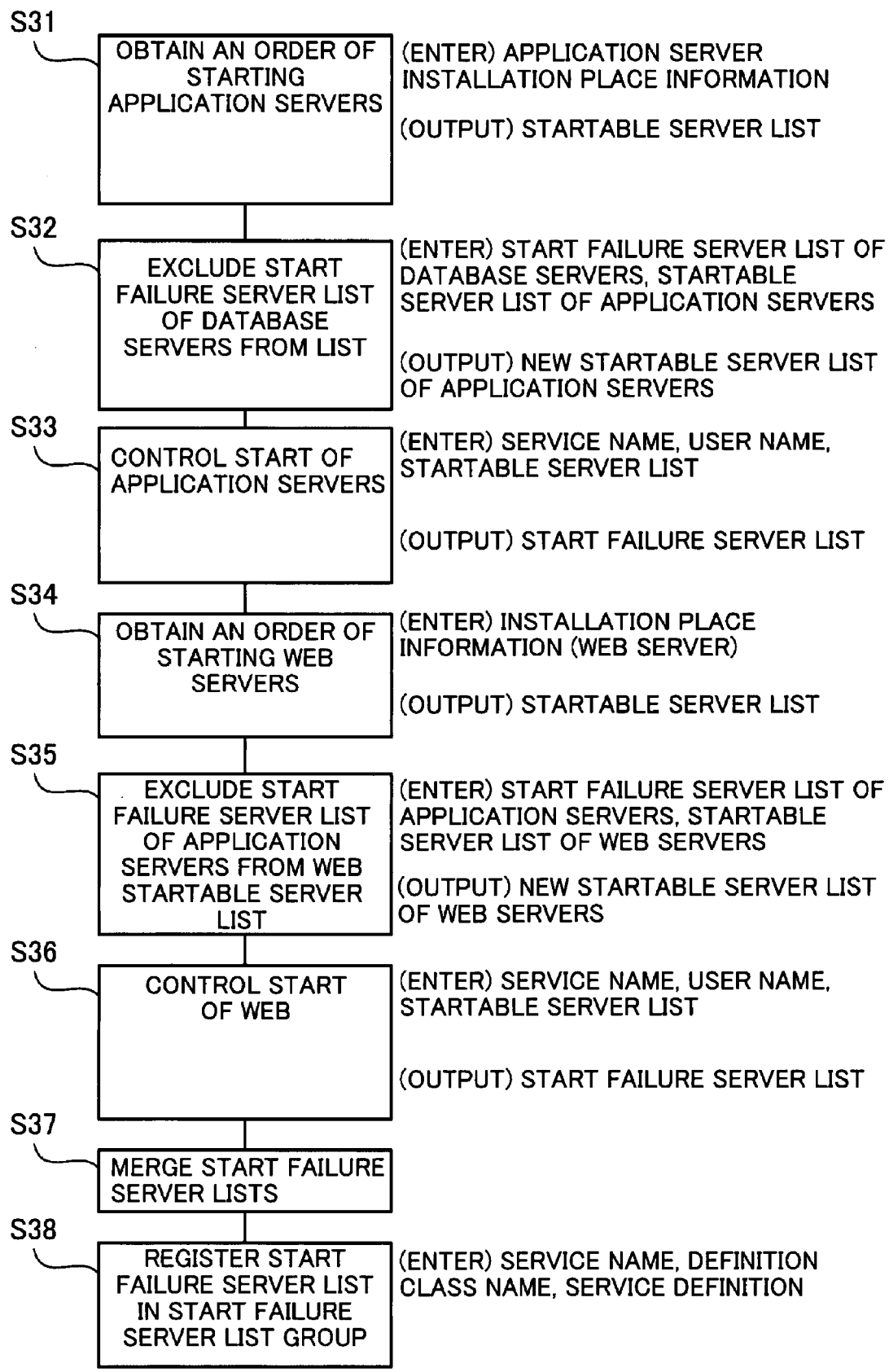
FIG. 16 is a view showing the second half of the detailed procedure of the start control process.

FIG. 16 is a view showing the second half of the detailed procedure of the start control process. The processes of FIG. 16 will be described following step numbers.

(Step S31) The start controller 123 acquires an order of starting application servers based on the application server installation place information. Specifically, this step is realized in the same way as steps S24a and S24b regarding the database servers.

(Step S32) The start controller 123 refers to the start failure server list of the database servers and the startable server list of the application servers, to exclude the application servers associated with start failure database servers out of the application servers registered in the startable server list of the application servers.

A database server associated with an application server is a database server that has the same order number in the case of the line connection. That is, in the line connection, if a database server could not be started successfully, an application server having the same order as the database server is excluded from start targets.

In the case of the mesh connection, on the other hand, a database server associated with an application server suggests all database servers of a database server group associated with the application server. In this case, if all database servers of the database server group could not be started successfully, the application server is excluded from start targets.

Thereby the startable server list of the application servers is updated.

(Step S33) The start controller 123 controls the start of application servers based on the service name, the user name, and the startable server list. Specifically, this step is realized in the same way as steps S25a and S25b regarding to the database servers. As a result of this step, a start failure server list of application servers is created.

(Step S34) The start controller 123 acquires an order of starting Web servers based on the Web server installation place information. Specifically, this step is realized in the same way as steps S24a and S24b regarding the database servers.

(Step S35) The start controller 123 refers to the start failure server list of the application servers and the startable server list of the Web servers, to exclude Web servers associated with start failure application servers, out of the Web servers registered in the startable server list of Web servers. As a result, the startable server list of Web servers is updated.

(Step S36) The start controller 123 controls the start of Web servers based on the service name, the user name, and the startable server list. Specifically, this step is realized in the same way as steps S25a and S25b regarding database servers. As a result, a start failure server list of Web servers is created.

(Step S37) The start controller 123 merges the start failure server lists of database servers, application servers, and Web servers.

(Step S38) The start controller 123 stores the start failure server lists in the start failure server list group 115, in association with service name, definition class name, and service definition.

As described above, even in the case where multilevel server applications are dispersedly installed on a plurality of managed server computers, the server applications can be started so as to provide normal services.

By the way, the above embodiment has shown a case of starting service provision. In addition, the server applications can be automatically stopped to complete the service provision. In this case, a stop order is a reverse order to the start. That is, the application servers are stopped in an order of Web servers, application servers, and database servers.

The processing functions described above can be realized by a computer. In this case, a program is prepared, which describes processes for the functions to be performed by the management server. The program is executed by a computer, whereupon the aforementioned processing functions are accomplished by the computer. The program describing the required processes may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes, etc. The optical discs include DVD (Digital Versatile Disc), DVD-RAM (Random Access Memory), CD-ROM (Compact Disc Read-Only Memories), CD-R (Recordable)/RW (ReWritable), etc. The magneto-optical recording media include MO (Magneto-Optical disks) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

According to the present invention, it is confirmed that an associated application that should be started in advance has been started, and then a starting process is performed on a start-target server computer. As a result, even if applications that provide a service are dispersedly installed on a plurality of server computers, the service can be provided to users in a condition where the service can be provided reliably.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A non-transitory computer-readable medium storing an application management program for managing a system where a plurality of applications that provide services in cooperation with each other are installed on individual server computers, the application management program causing a computer to execute a process comprising:
   receiving a request for starting provision of a service;
   sequentially selecting start-target server computers from among the server computers that should start applications thereon to provide the requested service, in reverse order to that in which the server computers are logically connected to propagate processing requests of the applications, by consulting server definition information describing installation states of the applications providing the service on the server computers;
   confirming whether an associated application that should be started before the application installed on the selected start-target server computer has been started correctly, by consulting status information containing results of a starting process to be performed by the server computers on the applications; and
   instructing the selected start-target server computer to start the application thereon, upon confirmation that the associated application has been started correctly, and registering success or failure of the start in the status information.

2. The non-transitory computer-readable medium according to claim 1, wherein, in a case where connecting line information defines that the associated application installed on a plurality of the server computers is a processing request destination from the application installed on the selected start-target server computer, said confirming confirms whether the associated application has been started correctly on at least one of the server computers, the connecting line information representing the relations in processing requests between the applications installed on the server computers.

3. The non-transitory computer-readable medium according to claim 1, wherein in a case where a plurality of the server computers are classified by installed applications, said selecting sequentially selects groups in the order of starting the applications, sequentially selects all server computers of a selected group as the start-target server computers, and shifts to process a next group.

4. The non-transitory computer-readable medium according to claim 3, wherein, in a case where connecting line information defines that one of the server computers of a group where the associated application is installed is a processing request destination from the application installed on the selected start-target server computer, said instructing instructs the selected start-target server computer to start the application only in a case where the associated application has been started correctly on the one server computer taken as the processing request destination, the connecting line information representing the relations in processing requests between the applications installed on the server computers.

5. The non-transitory computer-readable medium according to claim 3, wherein, in a case where connecting line information defines that all server computers of a group where the associated application is installed are processing request destinations from the application installed on the start-target server computer, said instructing instructs the selected start-target server computer to start the application in a case where the associated application has been started correctly on at least one of the server computers in the group where the associated application is installed, the connecting line information representing the relations in processing requests between the applications installed on the server computers.

6. The non-transitory computer-readable medium according to claim 1, wherein the starting order is defined so that requested applications are started before requesting applications.

7. The non-transitory computer-readable medium according to claim 1, wherein:
   the server definition information includes information indicating server computers unable to start applications because of failed installation of the applications; and
   said selecting excludes the server computers that are unable to start applications, from choices of the start-target server computers.

8. An application management method executed by a management computer to manage a system where a plurality of applications that provide services in cooperation with each other are installed on individual server computers, the application management method comprising:
   receiving, by the management computer, a request for starting provision of a service;
   sequentially selecting, by the management computer, start-target server computers from among the server computers that should start applications thereon to provide the requested service, in reverse order to that in which the server computers are logically connected to propagate processing requests of the applications, by consulting server definition information describing installation states of the applications providing the service on the server computers;
   confirming, by the management computer, whether an associated application that should be started before the application installed on the selected start-target server computer has been started correctly, by consulting status information containing results of a starting process to be performed by the server computers on the applications; and
   instructing, by the management computer, the selected start-target server computer to start the application thereon, upon confirmation that the associated application has been started correctly, and registering success or failure of the start in the status information.

9. An application management apparatus for managing a system where a plurality of applications that provide services in cooperation with each other are installed on individual server computers, the application management apparatus comprising:
   a selection unit, responsive to a request for starting provision of a service, that selects start-target server computers from among the server computers that should start applications thereon to provide the requested service, in reverse order to that in which the server computers are logically connected to propagate processing requests of the applications, by consulting server definition information describing installation states of the applications providing the service on the server computers;

a confirmation unit that confirms whether an associated application that should be started before the application installed on the selected start-target server computer has been started correctly, by consulting status information containing results of a starting process to be performed by the server computers on the applications; and a start control unit that instructs the selected start-target server computer to start the application thereon, upon confirmation that the associated application has been started correctly, and registers success or failure of the start in the status information.

10. A non-transitory computer-readable medium storing a program that causes a computer to execute a process, said process comprising:

receiving a start request;

selecting a plurality of applications associated with the start request, among which processing requests are passed in a first order; and starting the plurality of applications in a second order that is in reverse order to the first order in which the processing requests are passed.

* * * * *